March 9, 1926.

H. A. WOOFTER

METHOD OF ELECTRIC WELDING

Filed Feb. 3, 1925

1,576,169

INVENTOR.
Herbert A. Woofter.
BY Townsend & Decker
ATTORNEYS

Patented Mar. 9, 1926.

1,576,169

UNITED STATES PATENT OFFICE.

HERBERT ADDISON WOOFTER, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

METHOD OF ELECTRIC WELDING.

Application filed February 3, 1925. Serial No. 6,515.

*To all whom it may concern:*

Be it known that I, HERBERT A. WOOFTER, a citizen of the United States, and a resident of Swampscott, in the county of Essex and State of Massachusetts, have invented certain new and useful Improvements in Methods of Electric Welding, of which the following is a specification.

This invention relates to a method of and apparatus for electric welding and more particularly to methods and apparatus of such character that as the welding progresses the reactance of the work upon the conductor supplying current to the weld increases so as to absorb the electric power and thereby cause a difference in the amount of welding current at the beginning and at the end of the welding operation.

The invention is designed particularly for use in a method of and apparatus for electric seam welding, and its utility and principle of action will be best understood by reference to a common form of electric seam welder wherein the welding electrode is mounted upon a suitable movable carriage or support and moves over the work in producing the seam, while its connection with the source of welding current is maintained by sliding connection of said electrode with a rail or support extending out over the work and itself joined at one end to the source of welding current such for instance as the lower tension secondary of a transformer.

In a common form of this apparatus a roller welding electrode is employed and is mounted on a movable carriage which slides against a fixed upper electrode horn forming the upper member of the gap in which the work is arranged, so that as the roller electrode moves out from the beginning of the seam toward the end thereof the length of conductor traversed by the electric welding current becomes longer and thereby the power tends to drop off as the electrode moves.

In addition to the drop of power attributable to the increase of length and reactance drop of the conductor itself, there is a drop in power due to the fact that as the roller or electrode moves, more and more of the work assumes a reactive or inductive relation to the conductor carrying the current so that through this change of relation of the work to the conductor a further reactance drop ensues absorbing a large percentage of the power.

The practical result of these actions is that if the current be adjusted for starting the seam properly there will be a tendency to drop in welding current or power as the work progresses and with a seam of considerable length the current will be insufficient or unsuitable for the best welding results at the end of the seam.

The aim of my invention is to secure a practically uniform welding current throughout the progress of the welding operation by properly compensating for the drop due to change of reactance of the work or resistance in the supply conductor, one or both, as the work progresses. To accomplish this result I propose to automatically change the inductive relation of that element of the generator in which the welding current is produced by induction in a magnetic field, for direct application to the work, and progressively and in accordance with the progress of the work and in such manner that the power of the current generated will increase as the tendency to drop in current, from the causes above mentioned increases.

In carrying out my invention I prefer to employ as a current generator a suitable welding transformer and to connect the low tension secondary coil of the transformer with a movable element of the machine in such a manner that as the machine elements move a corresponding movement will be imparted to the current generating portion of said secondary and in such a way as to change its inductive or effective generating position in the transformer field and increase the electromotive force.

Preferably the current generating portion of said secondary so employed is a loop or turn thereof so arranged with relation to the magnetic field or core of the transformer that the effect of moving the same by its connection with the movable element of the welder will be to contract the loop or turn and thereby bring it into more effective or better magnetic relation with respect to the transformer field as the electrode moves.

1 indicates the fixed lower or work supporting horn of a seam welder and 2 indicates a piece of work supported thereon and consisting for instance of a cylinder of sheet metal to be completed by welding of the overlapping or juxtaposed edges of the metal sheet along the section or line 3. As will be well understood two plates or sheets instead of a single sheet with overlapping free edges might be welded.

Figure 2:
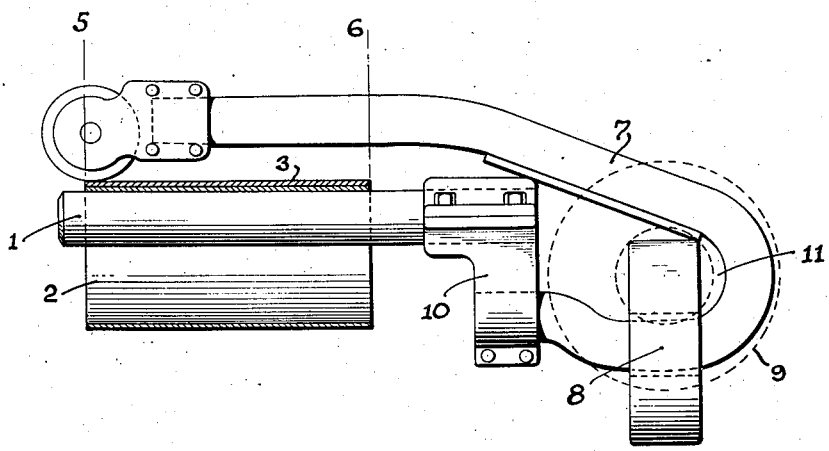
Fig. 2 shows the same parts at the end of the welding operation.

At 4 is indicated a welding electrode consisting for instance of a roller adapted to be moved along the seam between the vertical lines 5—6 the latter marking the extremes of the path described by the electrodes in completing the seam. Electrode 4 is supplied with current from the flexible secondary 7 of a transformer, the core of which is indicated at 8 while the primary is indicated at 9. The secondary loop or generating coil at its end opposite the welding electrode is fastened in welding connection with the metal support or bracket 10 carrying the horn 1 in the usual manner. As will be seen the flexible secondary loop or semi-turn is so arranged that at the beginning of the welding operation a very considerable air gap or space 11 between it and the core 8 is afforded, but when the electrode 6 is moved to the end of the seam as shown in Fig. 2 said loop will be contracted or drawn in with consequent decrease of said air gap and with a resulting change in position of the secondary element of the transformer with relation to the other elements such that an increase in electro-motive force or current output from said generator will result. This increase of electro-motive force takes place progressively as the electrode moves and substantially in accordance with the decrease of output due to the lengthening of the secondary terminal as well as to the increase of reaction of work as it comes in reactive relation to the portion of generating conductor above it. The proportion or relation of the parts may be made such that when the electrode is short-circuited in the position 6 without any work in the horn and again in position 5 and readings taken at each point, they may be made to show 20 percent less power output at 6 than at 5 which is the condition desired for no load condition. When however the work is inserted and the weld made by moving the electrode from 6 to 5, the instruments will show practically little or no drop as the welding progresses and the power curve becomes practically a horizontal straight line, the work gradually being introduced in the horn having absorbed what otherwise would have been the rise in the power curve. The travel of the electrode and the movement of the upper part of the secondary winding may be accomplished by any of the approved methods, such as by belt drive or motor suitably geared, and the primary winding and core of the transformer operate in accordance with established welding transformer practice.

Figure 1:
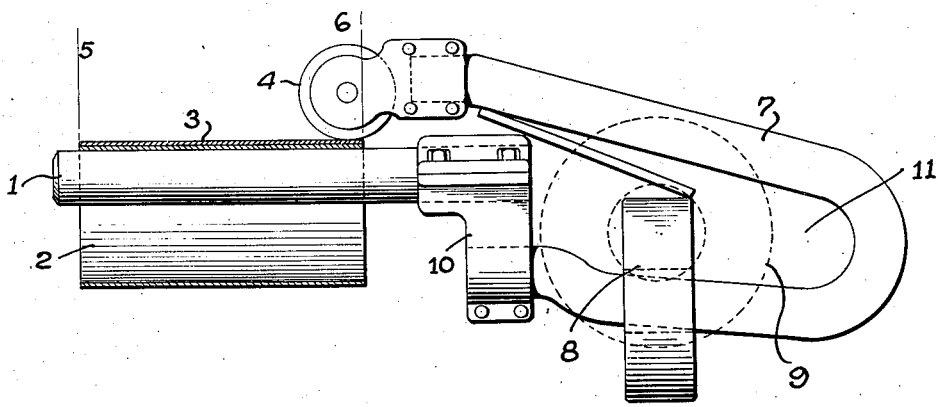
Fig. 1 shows in side elevation the essential elements of an apparatus in which my invention may be realized, the parts being shown in position corresponding to the beginning of a seam welding operation.

As will be obvious it results that when the weld is started the current may be such that there will be no burning at the start as has been the case in the past and the current will be sufficient to produce a proper weld, while as the electrode moves out along the work from position shown in Fig. 1 to position shown in Fig. 2 and the air gap or loop 11 is decreased there will be a progressive increase of electro-motive force tending to increase the power of the welder progressively so that the drop due to the changing position of the welding electrode and work with relation to one another will be compensated for and an approximately constant welding current attained.

What I claim as my invention is:

1. In an electric seam welding apparatus wherein a movable electrode has a flexible terminal of the secondary directly attached to and supplying current to said electrode, the method of compensating for the increased absorption of power by the work as the length of seam increases consisting in automatically decreasing the air gap between a portion of said flexible secondary and the transformer core to automatically produce a practically constant welding current in all positions of said electrode.

2. In an electric seam welding apparatus employing a movable electrode and flexible secondary, the method of compensating for the drop in power as the welding proceeds consisting in flexing a loop or turn of the secondary in the magnetic field of the transformer coincidently with the movement of the electrode so as to increase the electromotive force in a manner to obtain a practically constant welding current in all positions of the electrode.

3. In the art of electric seam welding by low tension current derived from a transformer and applied by means of an electrode in contact with the work, the method of compensating for the drop in power as the welding proceeds, consisting in contracting or drawing in the secondary with relation to the magnetic field to increase the electromotive force and secure a substantially constant output of welding current at the weld in all positions of said electrode on the seam.

Signed at Lynn, in the county of Essex and State of Massachusetts, this 28th day of January A. D. 1925.

HERBERT ADDISON WOOFTER.